April 13, 1948. F. H. JOBSON 2,439,391
ARTIFICIAL MINNOW
Filed Nov. 30, 1944
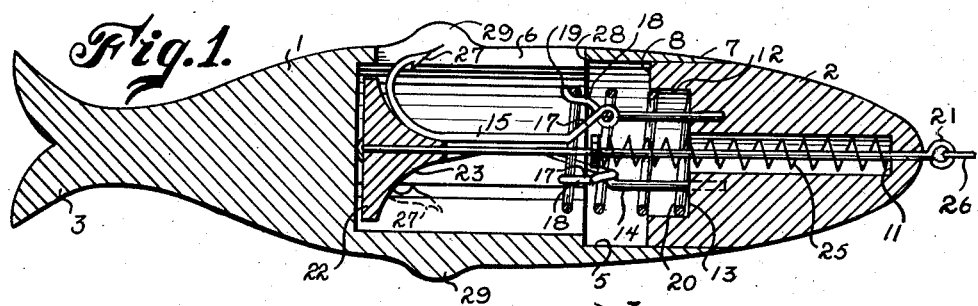
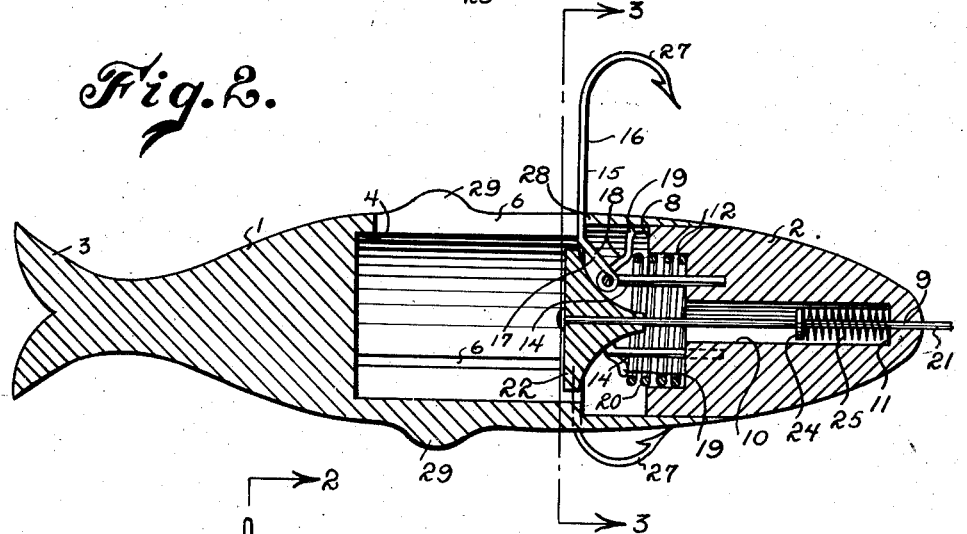
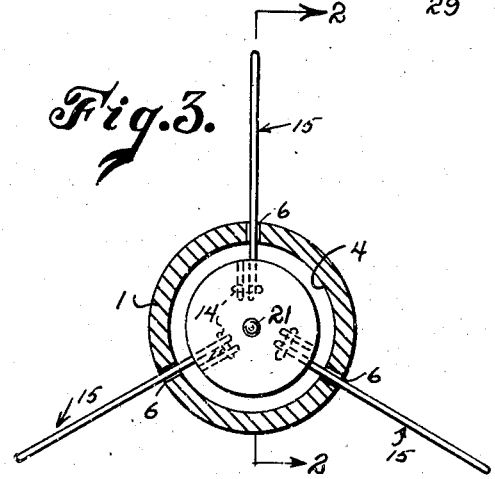
INVENTOR.
Frederic H. Jobson
BY Victor J. Evans & Co.
ATTORNEYS Patented Apr. 13, 1948

2,439,391

UNITED STATES PATENT OFFICE 2,439,391

ARTIFICIAL MINNOW

Frederic H. Jobson, Jeffersonville, Ga.

Application November 30, 1944, Serial No. 565,856

2 Claims. (Cl. 43—35)

My present invention, in its broad aspect, has reference to improvements in artificial fish bait, and more particularly, it is my purpose to provide an artificial minnow or other small fish commonly used for bait, wherein the hooks are normally concealed within the body of the minnow and do not leave the body of the minnow except when the minnow has been struck by a fish. Another object of my invention is to provide movable hooks normally housed and concealed within the body of the bait whereby the bait does not become fouled with weeds, debris and the like, and looks more like the minnow or other fish which it is designed to simulate. These hooks are so mounted that under the strain put on the line and bait by a fish when the bait has been struck, they quickly move outwardly to engage in the flesh of the fish, and become more deeply embedded in the fish as resistance is increased. Since all operating pressure on the hooks is effected by pull of the line, the bait itself occupies more or less of a dormant capacity in the active motivation of the hooks.

Another object of my invention is to simplify the construction of the bait itself, and to simplify, render more practical and efficient, the actuating mechanism for the hooks. Furthermore, means are provided for guarding the entrances of the hook receiving slots in the bait, and a unique and novel arrangement of springs, a wedge, and a camming effect is provided to positively move the hooks speedily from a dormant concealed position to an active exposed position.

Other important objects and advantages will be apparent from the following description taken with the accompanying drawings, but changes in the specific mechanical organization and detailed parts may be made to meet varying conditions of practice, provided same fall within the purview of my broad inventive concept.

In the drawings wherein I have illustrated a preferred form of my invention:

Figure 1 is a longitudinal section on the line 2—2 of Figure 3 showing the hooks in a dormant, concealed position;

Figure 2 is a longitudinal section on the line 2—2 of Figure 3 showing the hooks in an active, exposed position;

Figure 3 is a cross-section on the line 3—3 of Figure 2.

In the drawings wherein like characters of reference are used to designate like or similar parts throughout the several views:

The numeral 1 designates the body part of my artificial minnow, or other small fish or the like commonly used for bait, and 2 the head part. The body and head may be formed of plastic, wood, or other suitable material appropriately decorated to resemble the desired type of bait. The body has a tail part 3 and an axial cylindrical cavity 4, somewhat enlarged as at 5. Three elongated slots 6 are equally spaced from each other and formed in the wall of the body. Due to the normal curvature of the body to resemble the body of a fish, the forward edge 7 tapers to a fine edge. The head part 2 fits into the outer portion of the enlarged part 5 of the cavity as at 8 and may be glued or otherwise attached. At the nose is a small bore 9 entering a larger bore 10 forming a shoulder 11, and which latter bore enters a still larger bore 12 forming a shoulder 13 and which communicates with the enlarged cavity 5.

Pivotally mounted on three staples 14, or the like, fixed in shoulder 13, are three hooks 15 which are in registry with slots 6. Referring to Figures 1 and 2, the hooks 15 have their shanks 16 bent at an angle as at 17 and then turned about the staples 14 and the free ends extend at an angle 18 and terminate in small fingers 19. The angular parts 18 face toward the head of the bait, as do the hooks, and the inclination is upwardly and forwardly, with the fingers 19 extending laterally and pointing outwardly. A spring 20 seats against shoulder 13 and bears against the angular parts 18 and fingers 19—see Figure 1—to force the hooks to a position with their shanks 16 parallel and concealed within the cavity 4, and in effect, the spring binds the hooks in this position until released in the manner hereinafter described.

A wire leader 21 passes through bores 9—10—12 and into cavity 4 and carries a wedging member 22 with curved camming walls 23 flaring outwardly toward the tail of the bait. Spaced from the wedging or camming member 22 is a stop collar 24 against which bears a spring 25 seated against the shoulder 11 and housed in bore 10 to normally urge the wedging or camming member 22 toward the tail of the bait as shown in Figure 1. A fish line 26 is connected with leader 21.

Referring now to Figures 2 and 3, it will be noted that when the line is pulled forwardly and the bait remains relatively fixed as it would momentarily when struck by a fish, the wedge or camming member 22 is pulled forwardly against spring 25 urging the hooks outwardly through the slots to a position at right angles to the axis of the bait as shown in Figures 1 and 2. In accomplishing this action, the curved parts 27 of the hooks act as camming surfaces against camming faces 23 and the pressure applied to the hooks is sufficient to overcome the force of spring 20 and compress the spring. In the active position shown in Figure 2, the hooks engage the end walls 28 of slots 6, and by their position engage in the flesh of the fish contacting the bait. Continued resistance only tends to further embed the hooks. Suitable guard elevations 29 are formed at the edges of slots 6 to shield the hooks.

It will be noted that the hooks, when dormant, and concealed, cannot be fouled or ensnared in rubbish and the like.

It is believed that the operation, advantages, and construction of my invention will be apparent from the foregoing, but it is again emphasized that interpretation of my invention should only be conclusive when made in the light of the subjoined claims.

I claim:

1. An artificial fish lure, comprising a hollow, slotted body formed to resemble a bait, a bore in the forward end of said body, staples in said bore, pivoted hooks carried by the staples, a spring seated in the bore and encompassing the staples, said spring being adapted to normally hold the hooks in the body, a wedging member movable in the body and having a curved camming face engaging the hooks, a leader carrying the wedging member, a stop collar on said leader, a spring about the leader contacting the collar for normally urging the wedging member toward the tail of the bait in opposition to the force of which the wedging member moves under the draw of the leader to move the hooks out through the slots into active position.

2. An artificial fish lure, comprising a hollow body, a bore in the forward end of said body, staples in said bore, a series of slots in the wall of the body, a plurality of fish hooks pivoted in the body to said staples, angular arms on said hooks, a spring encompassing the staples and seated in the bore engaging the arms on the hooks to hold the hooks within the body, a wedging member having a camming face movable in the body, a leader passing through the wedging member, a stop collar on said leader, a spring on the leader contacting the collar for normally urging the wedging member toward the tail of the bait, the wedging member being movable against the hook and spring to force the hooks outwardly through the slots into active position, the curved parts of the hooks affording a camming surface for the cam face of the wedging member.

FREDERIC H. JOBSON.

REFERENCES CITED

The following references are of record in the file of this patent:

UNITED STATES PATENTS

| Number | Name | Date |
|---|---|---|
| 2,256,088 | Hogan | Sept. 16, 1941 |
| 1,486,028 | Meighen | Mar. 4, 1924 |
| 1,556,297 | Moore | Oct. 6, 1925 |